(12) United States Patent
Bills et al.

(10) Patent No.: US 6,330,571 B1
(45) Date of Patent: Dec. 11, 2001

(54) METHOD AND COMPUTER PROGRAM PRODUCT FOR IMPLEMENTING DATALINK PATH PROTECTION

(75) Inventors: Raymond Bills; Atul Kumar, both of Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/231,722

(22) Filed: Jan. 15, 1999

(51) Int. Cl.[7] .................................................. G06F 17/30
(52) U.S. Cl. ................................. 707/205; 707/1; 707/200
(58) Field of Search .................................. 707/204, 205, 707/1, 10, 102; 709/213, 223, 226; 714/4, 47; 379/88.22, 211, 260; 370/254, 400, 408, 413

(56) References Cited

U.S. PATENT DOCUMENTS 5,678,042 * 10/1997 Pisello et al. ......................... 714/47
5,987,506 * 11/1999 Carter et al. ......................... 709/213
6,108,285 * 8/2000 Freeman et al. ..................... 369/48

OTHER PUBLICATIONS (IEEE publication) TCP/IP performance with random loss and bidirectional congestion by Lakshman et al. in Networking IEEE/ACM Transactions, pp. 541–555 vol. 8 No. 5 (10–2000).*

(IEEE publication) Designn issues for high–performance active routers by Wolf et al. in Selected areas in communication, vol. 19; No. 3, pp. 404–409 (Mar. 2001).*

* cited by examiner

*Primary Examiner*—Diane D. Mizrahi
(74) *Attorney, Agent, or Firm*—Joan Pennington

(57) ABSTRACT

A method and computer program product are provided for implementing datalink path protection. A datalink designation is created in the computer system and a datalink indicator is turned on. A corresponding datalink path for the datalink designation is stored in a predefined prefix table. The datalink indicator is used for processing a directory rename or remove operation.

18 Claims, 7 Drawing Sheets

DIRECTORY TREE BEFORE
DATALINK CREATION

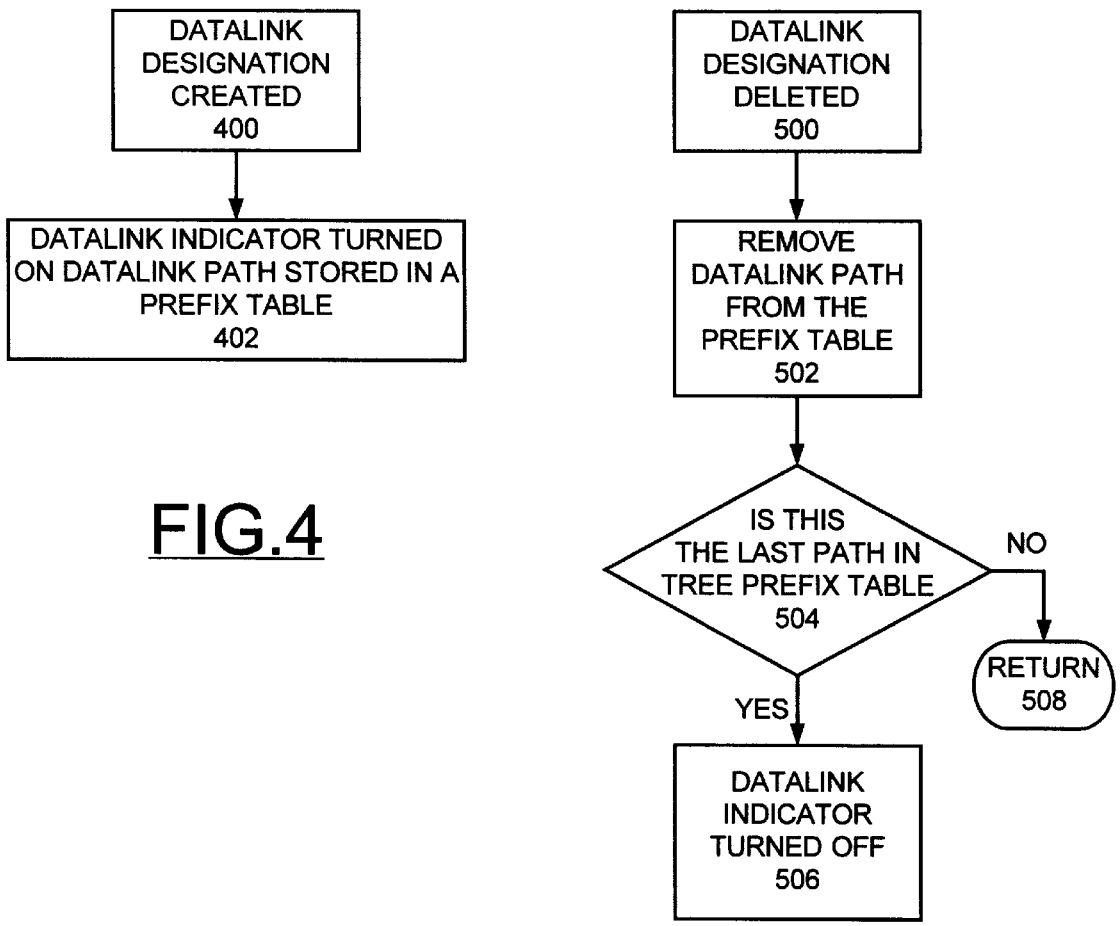

METHOD AND COMPUTER PROGRAM PRODUCT FOR IMPLEMENTING DATALINK PATH PROTECTION

FIELD OF THE INVENTION

The present invention relates to the data processing field, and more particularly, relates to a method and computer program product for implementing datalink path protection.

DESCRIPTION OF THE RELATED ART

The DATALINK data type is one of the basic building blocks for extending the types of data that can be stored in database files. The idea of a DATALINK is that the actual data stored in the column is only a pointer to the object. This object can be anything, an image file, a voice recording, a text file, and the like. The method used for resolving to the object is to store a Uniform Resource Locator (URL). This means that a row in a table can be used to contain information about the object in traditional data types, and the object itself can be referenced using the DATALINK data type. The user can use new SQL scalar functions to get back the path to the object and the size of the object. With the DATALINK data type, there is a fairly loose relationship between the row and the object. For instance, deleting a row will sever the relationship to the object referenced by the DATALINK, but the object itself might not be deleted.

Datalink support allows users to designate directories in a root file system to contain datalink objects. The datalink designations provide referential integrity of the linked files that are stored in the native file system. Once a directory is marked as a datalink designation, access to all objects in that directory subtree is through the datalink file manager (DLFM). When the objects in the datalink designations are marked as datalink objects, the DLFM creates a prefix table containing the path of the objects. Any attempt to access, remove, or rename these objects will be intercepted by the DLFM which prevents any deletion or renaming of the datalink objects by checking the paths against the stored prefix list.

Datalink support prevents a rename or removal of a datalink object. This is done by checking the path of the object being renamed or removed against a list of prefixes maintained by the datalink file manager. For example, if /a/b/c is a datalink designation and /a/b/c/d is a file marked as a datalink object. Deletion or rename of /a/b/c/d will be prevented by the datalink file manager. However, the path leading to the datalink object sometimes may be renamed if the directory object prior to the datalink designation gets renamed. For example if /a/b/c is a datalink designation, /a/b can be renamed. This would cause inconsistencies in the datalink's prefixes.

This problem is not addressed by any other platforms providing datalink support mainly because this has a significant performance impacts.

SUMMARY OF THE INVENTION

A principal object of the present invention is to provide a method and computer program product for implementing datalink path protection. Other important objects of the present invention are to provide such method and apparatus for implementing datalink path protection substantially without negative effects and that overcome many disadvantages of prior art arrangements.

In brief, a method and computer program product are provided for implementing datalink path protection. A datalink designation is created in the computer system and a datalink indicator is turned on. A corresponding datalink path for the datalink designation is stored in a predefined prefix table.

In accordance with features of the invention, the datalink indicator is used for processing a directory rename or remove operation.

BRIEF DESCRIPTION OF THE DRAWINGS

The present invention together with the above and other objects and advantages may best be understood from the following detailed description of the preferred embodiments of the invention illustrated in the drawings, wherein:

FIGS. 4, 5 and 6 are flow charts illustrating exemplary steps for implementing datalink path protection in accordance with the preferred embodiment.

DETAILED DESCRIPTION OF THE PREFERRED EMBODIMENTS

Figure 1:
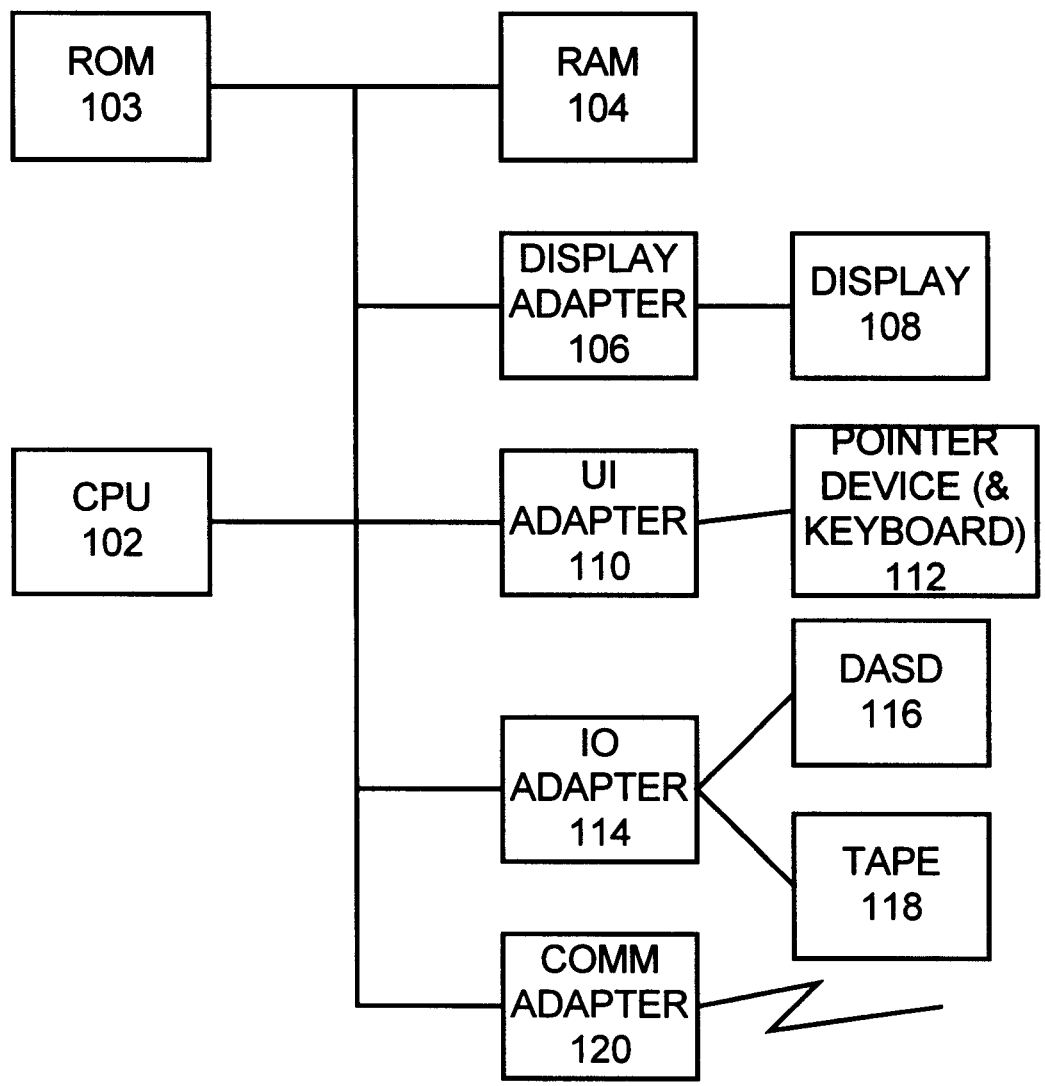
FIGS. 1 and 2 are block diagram representations illustrating a computer system and operating system for implementing a method and computer program product for implementing datalink path protection in accordance with the preferred embodiment.
Figure 2:
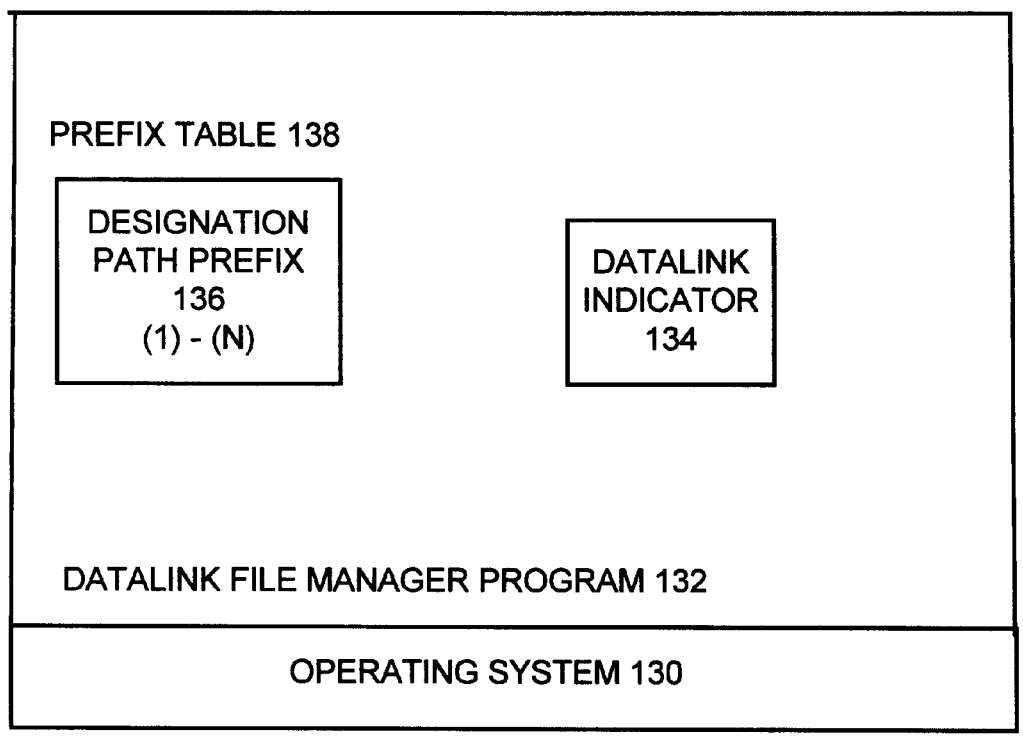

Having reference now to the drawings, in FIGS. 1 and 2, there is shown a computer or data processing system of the preferred embodiment generally designated by the reference character 100. As shown in FIG. 1, computer system 100 includes a central processor unit (CPU) 102, a read only memory 103, a random access memory 104, and a display adapter 106 coupled to a display 108. CPU 102 is connected to a user interface (UI) adapter 110 connected to a pointer device and keyboard 112. CPU 102 is connected to an input/output (IO) adapter 114 connected to a direct access storage device (DASD) 116 and a tape unit 118. CPU 102 is connected to a communications adapter 120 providing a communications function. It should be understood that the present invention is not limited to a computer model with a single CPU, or other single component architectures as shown in FIG. 1.

As shown in FIG. 2, computer system 100 includes an operating system 130, a Datalink File Manager program 132 of the preferred embodiment. A datalink indicator 134 is maintained in the file system to indicate whether or not datalinks exist on the system 100. Whenever a datalink designation 136 is created on the system 100 for the first time, this datalink indicator 134 is turned on and a designation path 136 is stored in a prefix table 138. The prefix table 138 is managed by the datalink File Manager 132. Whenever, a datalink designation is removed, the corresponding prefix 136 will be removed from the prefix table 138 and upon the removal of last prefix 136 from the prefix table 138, the datalink indicator 134 is turned off.

Figure 3A:
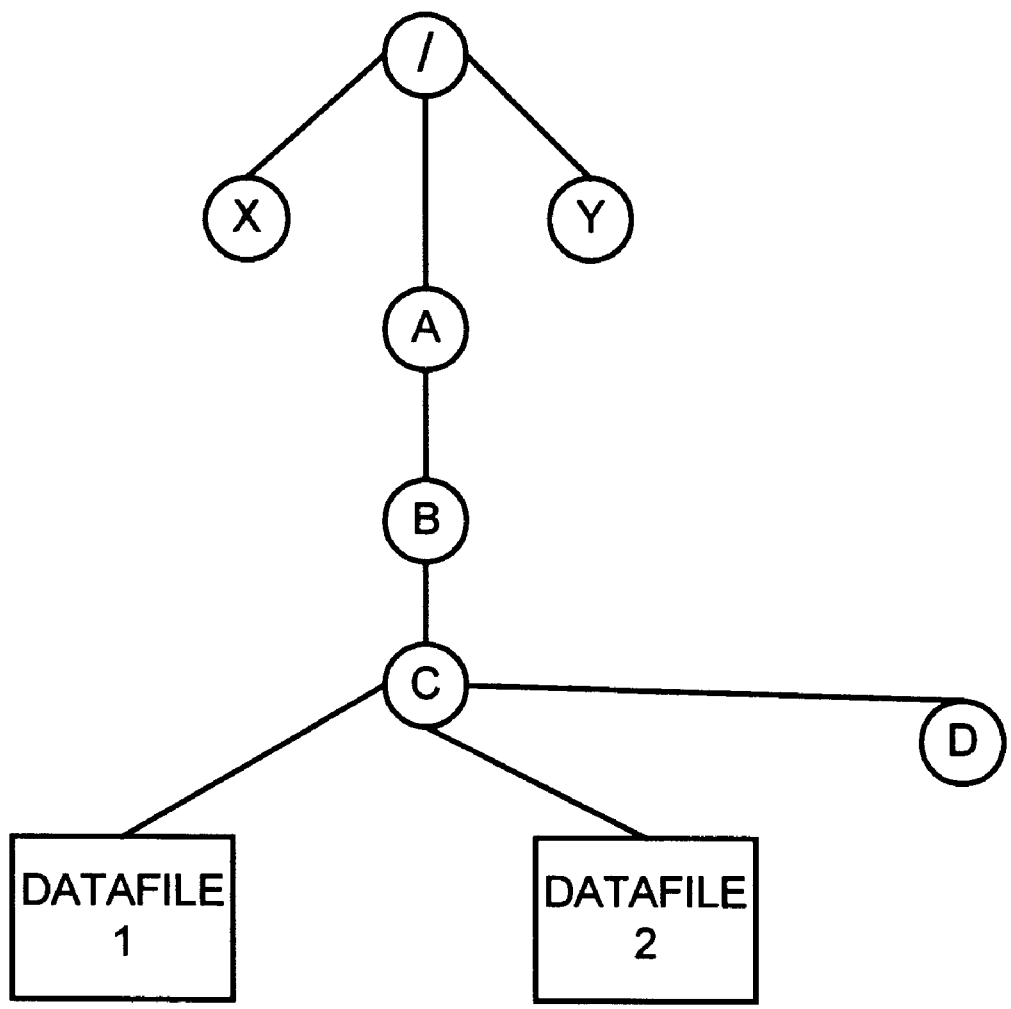
FIGS. 3A and 3B are diagrams illustrating exemplary directory tree structures before and after datalink creation in accordance with the preferred embodiment.
Figure 3B:
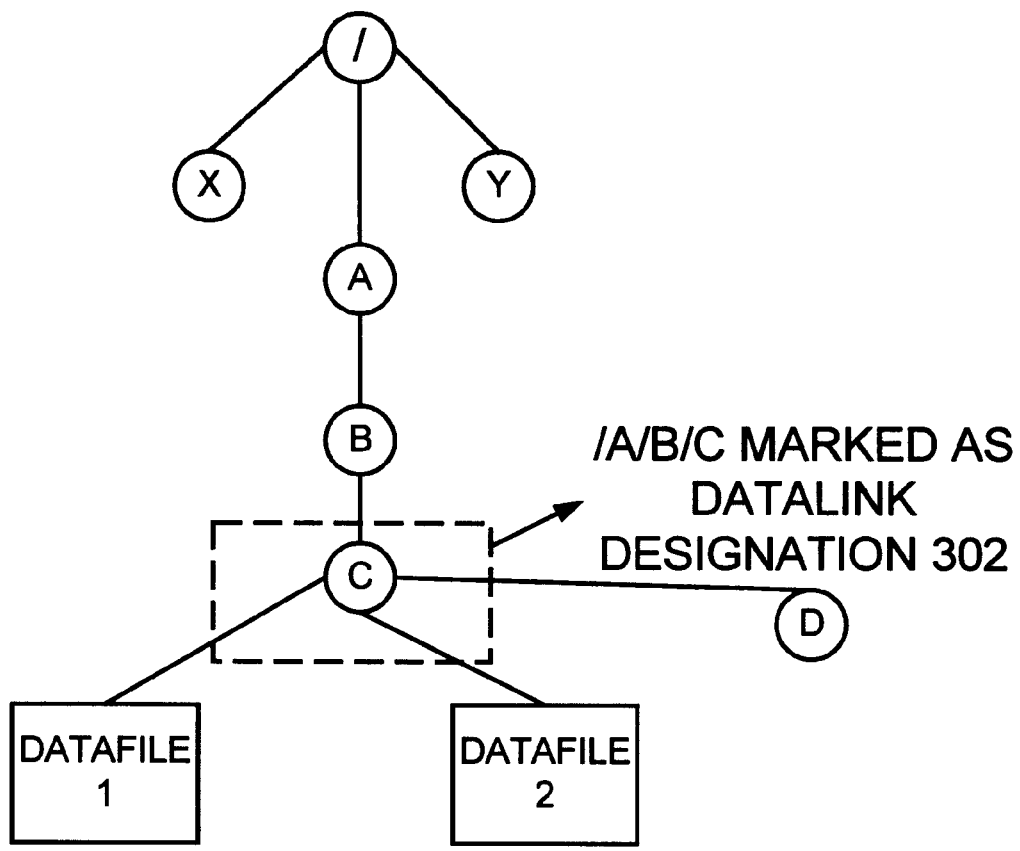

Referring to FIGS. 3A and 3B, exemplary directory tree structures before and after datalink creation are shown in accordance with the preferred embodiment. In FIG. 3B, /A/B/C is marked as a datalink designation 302 in the directory tree structure after datalink creation.

In accordance with features of the preferred embodiment, the method of the preferred embodiment prevents renaming of a path leading to datalink designations 302 thus enhancing the referential integrity that datalinks provides. File systems that support datalinks, search the datalink prefix 136 if the datalink indicator 134 is on during a rename operation to see if there are any datalinks in the path. For example, this prevents renaming of /a/b where /a/b/c is a datalink designation 302. This approach while guaranteeing datalink consistency in preserving the namespace also minimizes performance impacts. The presence of datalink 302 is quickly checked, by checking the datalink indicator 134 and if datalink indicator 134 is not turned on, datalinks 302 are not present on the system, so that no prefix lookup is done. This avoids any extra operations and minimizes performance impacts.

Referring to FIG. 4, exemplary steps are shown for datalink creation responsive to the datalink file manager program 132. A datalink designation, such as datalink designation 302 of FIG. 3B, is created as indicated at block 400. The datalink indicator 134 is turned on and a corresponding datalink path prefix 136 is stored in a prefix table 138 as indicated at block 402.

Referring to FIG. 5, exemplary steps are shown for datalink deletion responsive to the datalink file manager program 132. A datalink designation, such as datalink designation 302 of FIG. 3B, is deleted as indicated at block 500. The corresponding datalink path prefix 136 is removed from the prefix table 138 as indicated at block 502. Checking whether this is the last path in the prefix table 138 is performed as indicated at decision block 504. If so, then the datalink indicator 134 is turned off as indicated at block 506. Otherwise, if not the last path in the prefix table 138 then the sequential operations return as indicated at block 508.

Figure 6:
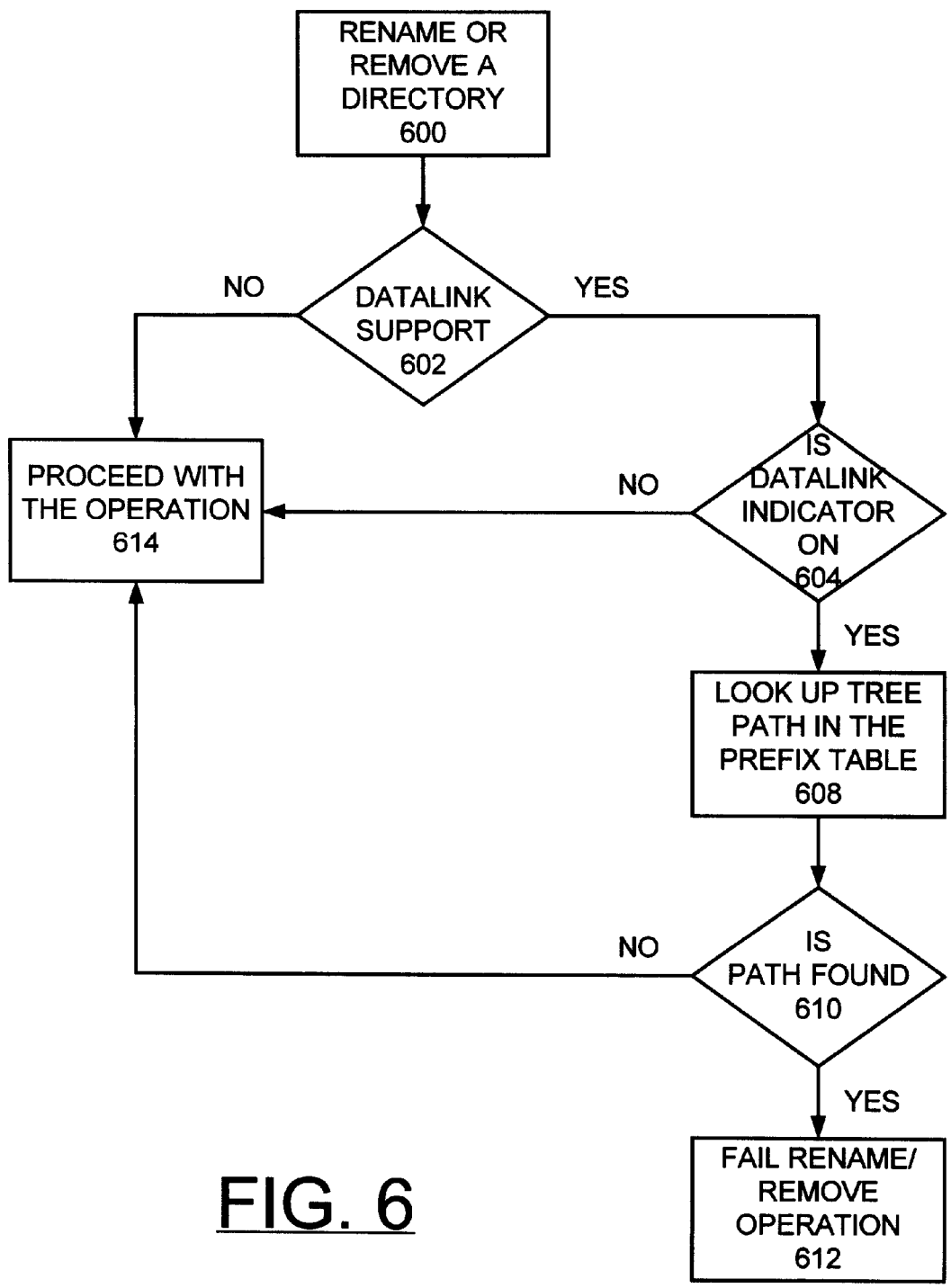

Referring to FIG. 6, exemplary steps are shown for using the datalink indicator 134 responsive to the datalink file manager program 132. A directory rename or remove operation is identified as indicated at block 600. Checking for datalink support is performed as indicated at decision block 602. When datalink support is identified, checking for the datalink indicator 134 being on is performed as indicated at decision block 604. When the datalink indicator 134 is on, then datalink tree path lookup in the prefix table 138 is performed as indicated at block 608. Checking whether a path is found is performed as indicated at decision block 610. If a path is found, then the rename or rename operation is failed as indicated at block 612. When datalink support is not identified at decision block 602, the datalink indicator 134 is off at decision block 604, or a path is not found at decision block 610, then proceeding with the rename or remove operation is provided as indicated at block 614.

Figure 7:
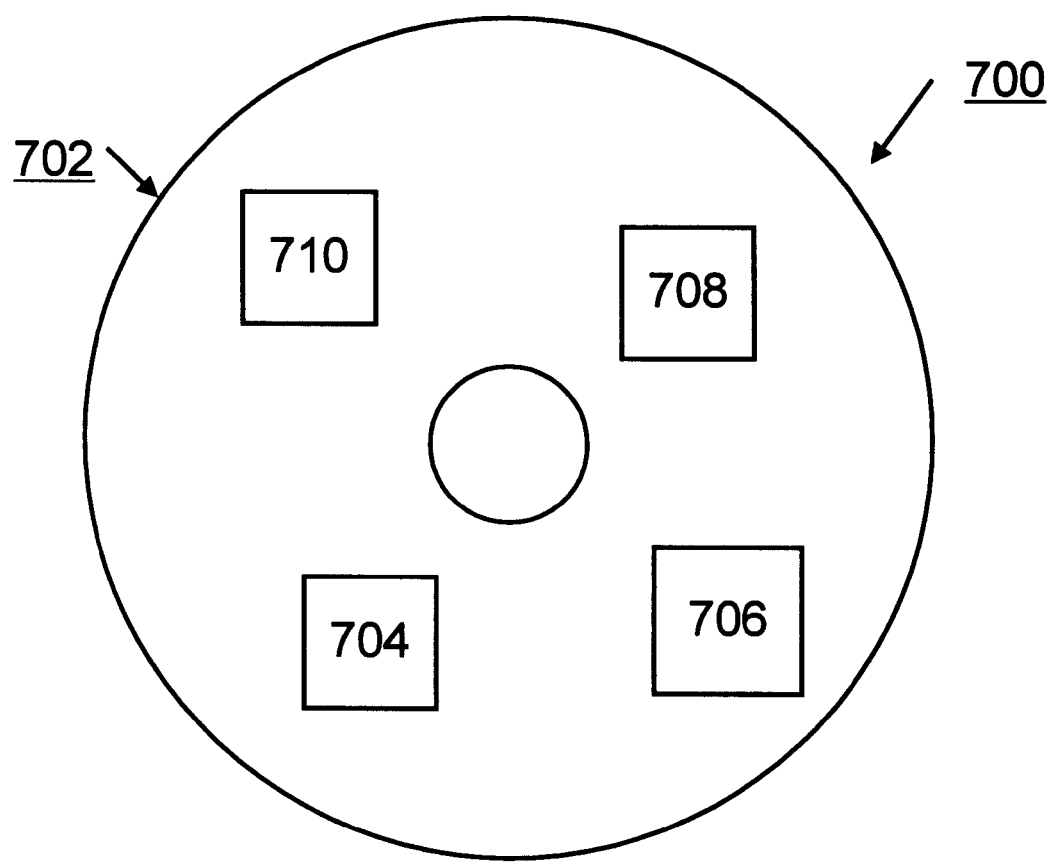
FIG. 7 is a block diagram illustrating a computer program product in accordance with the preferred embodiment.

Referring now to FIG. 7, an article of manufacture or a computer program product 700 of the invention is illustrated. The computer program product 700 includes a recording medium 702, such as, a floppy disk, a high capacity read only memory in the form of an optically read compact disk or CD-ROM, a tape, a transmission type media such as a digital or analog communications link, or a similar computer program product. Recording medium 702 stores program means 704, 706, 708, 710 on the medium 702 for carrying out the methods for implementing datalink path protection of the preferred embodiment in the system 100 of FIGS. 1 and 2.

A sequence of program instructions or a logical assembly of one or more interrelated modules defined by the recorded program means 704, 706, 708, 710, direct the computer system 100 for implementing datalink path protection of the preferred embodiment.

While the present invention has been described with reference to the details of the embodiments of the invention shown in the drawing, these details are not intended to limit the scope of the invention as claimed in the appended claims.

What is claimed is:

1. A method for implementing datalink path protection in a computer system comprising the steps of:

creating a datalink designation in the computer system;

responsive to creating said datalink designation, turning on a datalink indicator; said datalink indicator being turned on to indicate the presence of said datalink designation in the computer system; and storing a corresponding datalink path for said datalink designation in a predefined prefix table.

2. The method for implementing datalink path protection in a computer system as recited in claim 1 further includes the steps of deleting said datalink designation in the computer system and removing said corresponding datalink path in said predefined prefix table.

3. The method for implementing datalink path protection in a computer system as recited in claim 2 further includes the step of checking if said removed datalink path is a last datalink path in said predefined prefix table.

4. The method for implementing datalink path protection in a computer system as recited in claim 3 further includes the step responsive to identifying said removed datalink path as said last datalink path in said predefined prefix table, of turning off said datalink indicator.

5. The method for implementing datalink path protection in a computer system as recited in claim 1 further includes the step of using said datalink indicator for processing a directory rename operation and for processing a directory remove operation.

6. The method for implementing datalink path protection in a computer system as recited in claim 5 further includes the steps of checking for datalink support; and responsive to not identifying datalink support, proceeding with said directory rename operation or proceeding with said directory remove operation.

7. The method for implementing datalink path protection in a computer system as recited in claim 5 further includes the step of checking for said datalink indicator being on; and responsive to not identifying said datalink indicator being on, proceeding with said directory rename operation or proceeding with said directory remove operation.

8. The method for implementing datalink path protection in a computer system as recited in claim 5 further includes the step of performing datalink tree path lookup in said prefix table.

9. The method for implementing datalink path protection in a computer system as recited in claim 8 further includes the step of identifying a datalink tree path in said prefix table; and responsive to said identified a datalink tree path, failing said directory rename operation or failing said directory remove operation.

10. A computer program product for implementing datalink path protection in a computer system comprising:

a recording medium;

means, recorded on the recording medium, for creating a datalink designation in the computer system;

means, recorded on the recording medium, responsive to creating said datalink designation, for turning on a datalink indicator; said datalink indicator being turned on to indicate the presence of said datalink designation in the computer system; and means, recorded on the recording medium, for storing a corresponding datalink path for said datalink designation in a predefined prefix table.

11. The computer program product for implementing datalink path protection in a computer system as recited in claim 10 includes said means, recorded on the recording medium, for deleting said datalink designation in the computer system, and for removing said corresponding datalink path in said predefined prefix table.

12. The computer program product for implementing datalink path protection in a computer system as recited in claim 11 includes said means, recorded on the recording medium, for checking if said removed datalink path is a last datalink path in said predefined prefix table; and responsive to identifying said removed datalink path as said last datalink path in said predefined prefix table, for turning off said datalink indicator.

13. The computer program product for implementing datalink path protection in a computer system as recited in claim 10 includes said means, recorded on the recording medium, for using said datalink indicator for processing a directory rename operation and for processing a director remove operation.

14. The computer program product for implementing datalink path protection in a computer system as recited in claim 10 includes said means, recorded on the recording medium, for checking said datalink indicator and responsive to said datalink indicator being turned off, for processing a directory rename operation and for processing a director remove operation.

15. A computer system comprising:

a processor, a memory coupled to the processor for storing a computer program product for implementing datalink path protection; said computer program product including a plurality of computer executable instructions stored on a computer readable medium, wherein said instructions, when executed by said computer, cause the computer to perform the steps of:

creating a datalink designation in the computer system;

responsive to creating said datalink designation, turning on a datalink indicator; said datalink indicator being turned on to indicate the presence of said datalink designation in the computer system; and storing a corresponding datalink path for said datalink designation in a predefined prefix table.

16. The computer system as recited in claim 15 wherein said instructions, when executed by said computer, cause the computer to perform the steps of deleting said datalink designation in the computer system, and removing said corresponding datalink path in said predefined prefix table.

17. The computer system as recited in claim 16 wherein said instructions, when executed by said computer, cause the computer to perform the steps of checking if said removed datalink path is a last datalink path in said predefined prefix table; and responsive to identifying said removed datalink path as said last datalink path in said predefined prefix table, turning off said datalink indicator.

18. The computer system as recited in claim 15 wherein said instructions, when executed by said computer, cause the computer to perform the steps of identifying a directory rename operation or a directory remove operation, checking said datalink indicator and responsive to said datalink indicator being turned off, processing said directory rename operation or processing said directory remove operation.

\* \* \* \* \*